United States Patent
Nomura et al.

(10) Patent No.: US 11,227,020 B2
(45) Date of Patent: Jan. 18, 2022

(54) DISPLAYING CONTENT BASED ON A USER'S STATUS

(71) Applicant: International Business Machines Corporation, Armonk, NY (US)

(72) Inventors: Yuka Nomura, Tokyo (JP); Daisuke Tomoda, Yokohama (JP); Hiroki Yoshinaga, Urayasu (JP)

(73) Assignee: International Business Machines Corporation, Armonk, NY (US)

(*) Notice: Subject to any disclaimer, the term of this patent is extended or adjusted under 35 U.S.C. 154(b) by 833 days.

(21) Appl. No.: 15/234,020

(22) Filed: Aug. 11, 2016

(65) Prior Publication Data

US 2018/0046654 A1 Feb. 15, 2018

(51) Int. Cl.
*G06F 16/951* (2019.01)
*G06F 16/9535* (2019.01)

(52) U.S. Cl.
CPC ........ *G06F 16/951* (2019.01); *G06F 16/9535* (2019.01)

(58) Field of Classification Search
CPC ......... G06F 17/30867; G06F 17/30864; G06F 17/30905; G06F 3/048; G06F 17/30761; G06F 17/3087; G06F 17/3097; G06F 17/30035; G06F 17/30289; G06F 17/30528; G06F 17/30554; G06F 17/3064; G06F 3/04842
See application file for complete search history.

(56) References Cited

U.S. PATENT DOCUMENTS

| | | | |
|---|---|---|---|
| 7,797,267 B2 | 9/2010 | Horvitz | |
| 8,489,599 B2 | 7/2013 | Bellotti | |
| 9,298,786 B1* | 3/2016 | Wang | G06F 16/9535 |
| | | | 707/999.003 |
| 2008/0301746 A1* | 12/2008 | Wiser | H04N 7/17318 |
| | | | 725/114 |
| 2010/0138416 A1* | 6/2010 | Bellotti | G06F 17/30032 |
| | | | 707/736 |
| 2010/0145678 A1* | 6/2010 | Csomai | G06F 17/241 |
| | | | 704/9 |

(Continued)

FOREIGN PATENT DOCUMENTS

JP 2001043125 A 2/2001

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Yuk Ting Choi
(74) *Attorney, Agent, or Firm* — Mark Bergner

(57) ABSTRACT

A webpage from a network server is received. The content of the received webpage is parsed. A first set of contextual data from one or more sources is collected. A first relationship between the collected first set of contextual data and the parsed content is identified. The identified relationship is determined to satisfy a first threshold. The parsed content is stored in a database for future display in response to the identified relationship satisfying the first threshold. At least a portion of the parsed content not stored in the database is displayed.

20 Claims, 6 Drawing Sheets

(56) References Cited

U.S. PATENT DOCUMENTS

| | | | | |
|---|---|---|---|---|
| 2010/0169340 | A1* | 7/2010 | Kenedy | G06Q 30/02 707/758 |
| 2014/0062865 | A1* | 3/2014 | Fateh | G06T 11/206 345/156 |
| 2015/0067754 | A1* | 3/2015 | Wiser | H04N 21/2668 725/120 |
| 2015/0170041 | A1* | 6/2015 | Shishido | G06F 17/30752 706/48 |
| 2015/0339405 | A1* | 11/2015 | Vora | G06F 17/30958 707/706 |
| 2016/0012055 | A1* | 1/2016 | Bai | G06F 17/30867 707/734 |
| 2016/0154887 | A1* | 6/2016 | Zhao | G06F 17/30053 707/727 |

OTHER PUBLICATIONS

Wikipedia, "iCloud", https://en.wikipedia.org/wiki/ICloud, printed Aug. 9, 2016, 9 pgs.

Cassidy, V., "Beyond Bookmarks: The 10 Best Read It Later Apps for Saving Articles and Videos," https://zapier.com/blog/best-bookmaking-read-it-later-app/, Aug. 25, 2015, printed Aug. 10, 2016, 5 pgs.

Unknown, "Catchbox," https://chrome.google.com/webstore/detail/catchbox/bphgdmbjmmeknehhdeidpabgipcgnilb, 1 pg.

Unknown, "Read later article to be worried about in the mobile phone "later Home"," /translate.google.com/translate?hl=en&sl=ja&u=http://designwork-s.com/category/2823680-153.html&prev=search, May 23, 2008, printed Aug. 10, 2016, 1 pg.

* cited by examiner

DISPLAYING CONTENT BASED ON A USER'S STATUS

BACKGROUND

The present invention relates generally to the field of data processing, and more particularly to software development, installation, and management.

A web browser (commonly referred to as a browser) is a software application for retrieving, presenting, and traversing information resources on the World Wide Web. An information resource is identified by a Uniform Resource Identifier (URI/URL) and may be a web page, image, video or other piece of content. Hyperlinks present in resources enable users easily to navigate their browsers to related resources. Although browsers are primarily intended to use the World Wide Web, they can also be used to access information provided by web servers in private networks or files in file systems.

SUMMARY

Embodiments of the present invention disclose a method, computer program product, and system for dynamically storing parsed content of a webpage for future display. A webpage from a network server is received. The content of the received webpage is parsed. A first set of contextual data from one or more sources is collected. A first relationship between the collected first set of contextual data and the parsed content is identified. The identified relationship is determined to satisfy a first threshold. The parsed content is stored in a database for future display in response to the identified relationship satisfying the first threshold. At least a portion of the parsed content not stored in the database is displayed.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
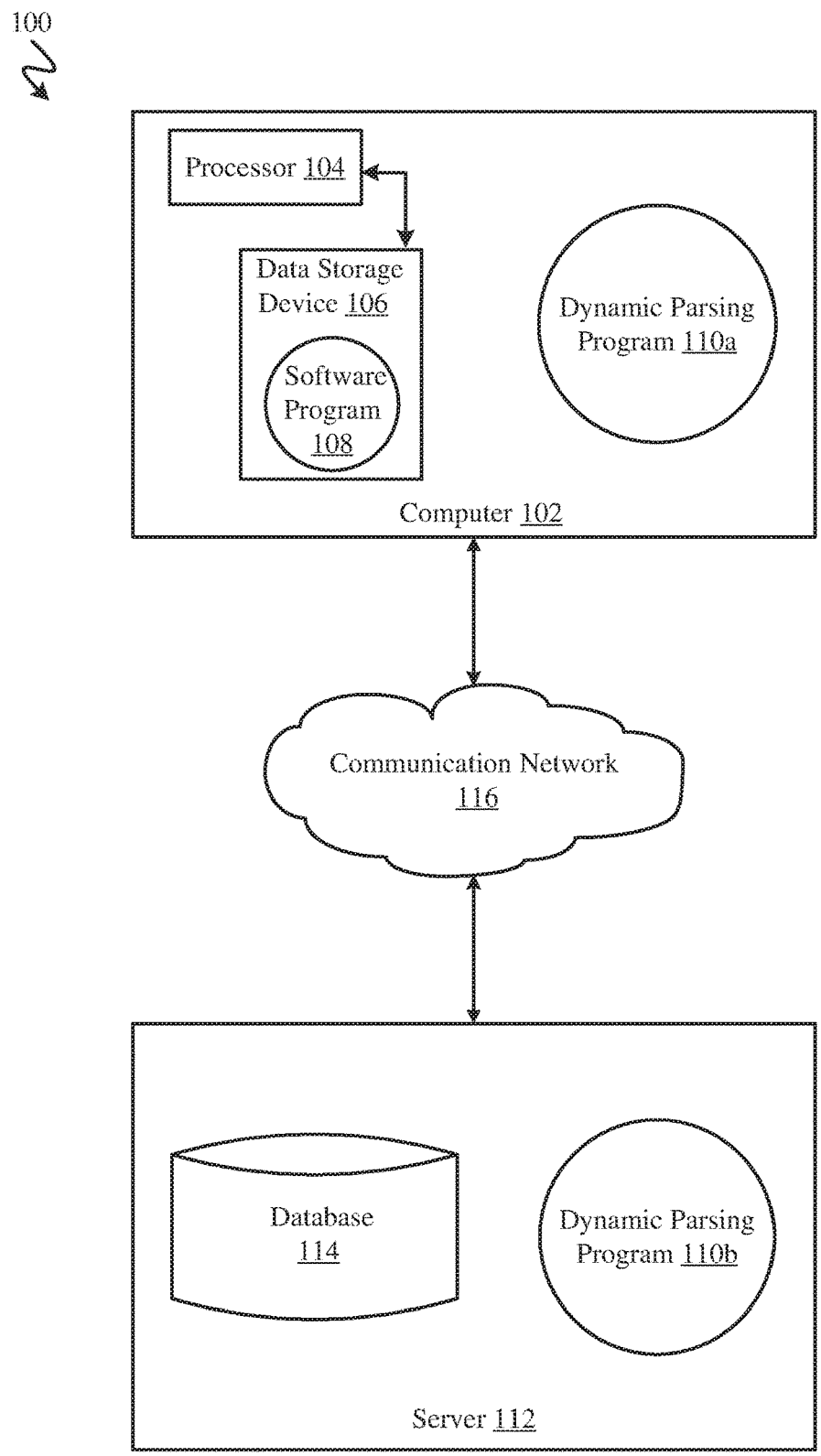
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Often times, a user may view a portion of content within a web browser that may not coincide with a current status of the user. For example, a user may be on a diet and a portion of content within a web browser may display an image of an unhealthy snack. The user may not want to view the portion of content (e.g., the image of the unhealthy snack) at a particular time (e.g., midnight) and may want to view that portion of content at a later time, or not at all. As another example, a user may load a webpage that may display content that may be inappropriate (e.g., social media) while at work. As yet another example, the user may load a webpage on a smartphone that requires software not uploaded on his phone to view the portion of content. The user may want to view the portion of content at a later time.

Therefore, it may be advantageous to, among other things, provide a way to prevent a portion of content from being displayed within a web browser, and then store the at least a portion of content in a database for future display by the user. The stored portion of content may be displayed as a reminder in the form of a list when the user loads another web browser at a later time.

According to one embodiment, a parsing program may be implemented to prevent at least a portion of content of a loaded web page from being displayed within a web browser. The parsing program may parse content of the loaded webpage, and then comply with a predefined set of rules that may be established according to contextual data that may be characteristics of a user (e.g., mood, diet, sleeping schedule) or characteristics of an immediate environment of the user (e.g., geographic location of the user, temperature, altitude, and/or current time) that may be collected from one or more sources (e.g., camera, thermometer, historical data, GPS, internet browsing history, personal electronic device, etc.). The contextual data may be analyzed with respect to the predefined set of rules to determine whether to display the at least a portion of content, or to store the at least a portion of predefined content within a database for display when a user loads a new web browser.

The following described exemplary embodiments provide a system, method and program product for dynamically preventing at least a portion of content of a webpage from being displayed, and then storing the at least a portion of the content of the webpage within a database for display when a user loads a new browser. As such, the present embodiment has the capacity to improve the technical field of data processing by preventing at least a portion of content that may not coincide with a user's current status from being displayed. More specifically, preventing at least a portion of content that may not coincide with a user's current status from being displayed until a later time that may be more appropriate for the user to view the at least a portion of content.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic parsing program 110a. The networked computer environment 100 may also include a server 112 that is enabled to run a dynamic parsing program 110b that may interact with a database 114 and a communication network 116. The networked computer environment 100 may include one or more computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic parsing program 110a, 110b may interact with a database 114 that may be embedded in various storage devices, such as, but not limited to a computer/mobile device 102, a networked server 112, or a cloud storage service. The database 114 can include previously parsed content of web pages, user historical data, user information, and collected contextual data. The dynamic parsing program 110a and 110b may be updated in any system associated with the dynamic parsing program 110a and 110b (e.g., database 114).

According to the present embodiment, a user using a client computer 102 or a server computer 112 may use the dynamic parsing program 110a, 110b (respectively) to parse webpages and then identify a relationship between the parsed content and collected contextual data, then, if the identified relationship satisfies a threshold, the parsed content may be stored in the database 114 for future display when the user loads a new webpage. The dynamic parsing method is explained in more detail below with respect to FIGS. 2 and 3.

Figure 2:
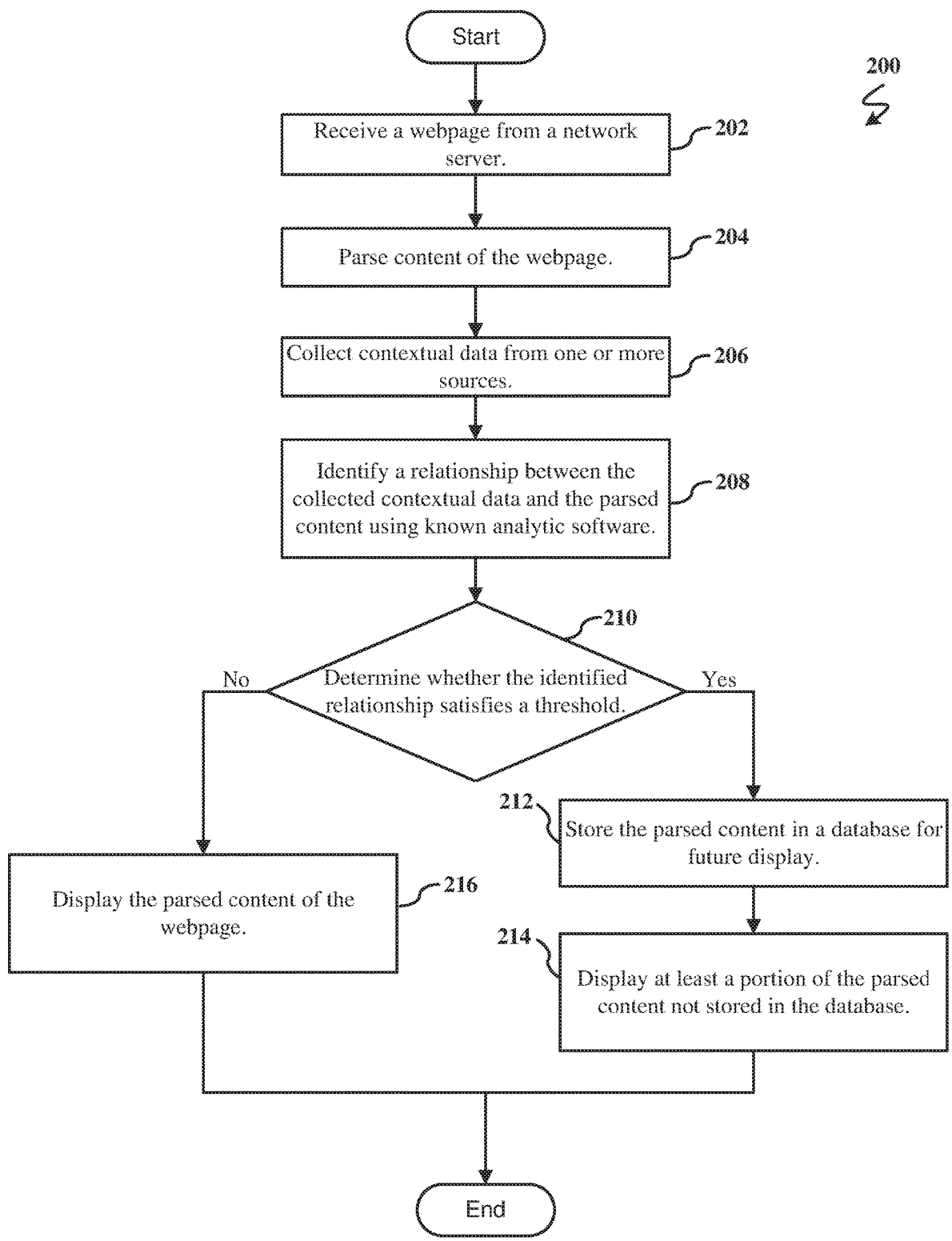
FIG. 2 illustrates an operational flowchart illustrating an exemplary parsing process by a dynamic parsing program according to at least one embodiment.

Referring now to FIG. 2, an operational flowchart illustrating the exemplary parsing process 200 by the dynamic parsing program 110a and 110b (FIG. 1) according to at least one embodiment is depicted. At 202, the dynamic parsing program 110a and 110b (FIG. 1) receives a webpage from a network server (e.g., server 112 (FIG. 1)). The webpage may be any webpage on the Internet (e.g., a news webpage, a cooking webpage, an event webpage, etc.). The network server may be an electronic device that can provide functionality (e.g., store text files, audio files, and video files, provide software methods, retrieve files, etc.) for other devices. The webpage may contain content, such as advertisements, text, audio, and/or video. The request may have been an automatic setting made by the user as an option within the dynamic parsing program 110a and 110b (FIG. 1).

Then, at 204, the dynamic parsing program 110a and 110b (FIG. 1) parses the content of the webpage. The dynamic parsing program 110a and 110b (FIG. 1) may parse the content of the webpage, then generate corresponding data structures for one or more portions of the webpage. For example, the dynamic parsing program 110a and 110b (FIG. 1) may output parsed text elements from the webpage as data structures. Additionally, a parsed text element may be represented in the form of a parse tree or other graph structure. The dynamic parsing program 110a and 110b (FIG. 1) may also parse audio and video recordings within the webpage.

Furthermore, the dynamic parsing program 110a and 110b (FIG. 1) may be a natural language processing system capable of entity resolution techniques that may be helpful in identifying important entities with the webpage. Entity resolution techniques may identify entities (e.g., concepts and keywords) within a webpage or text. Once entities have been identified, correlations and linguistic links between entities may be detected and used to establish relevance of the entities and, ultimately, the context of the webpage. An example technique that may be useful in determining the relative importance of a given entity to the context of the passage is inverse document frequency, which utilizes the relative commonality of the entity as an indicator of its importance to evaluating context. Many other techniques may also be used.

Next, at 206, the dynamic parsing program 110a and 110b (FIG. 1) collects contextual data from one or more sources. The contextual data may be biometric data of the user (e.g., heartrate, body temperature, and/or mood) collected from a personal electric device (e.g., electronic watch, and/or laptop). The contextual data may be a geographic location of the user collected from the personal electronic device. The contextual data may also be data pertaining to electronic accessories (e.g., headphones) associated with the personal device. For example, the contextual data may be an indication that headphones are now plugged into the personal device or that the personal device has connected to a certain WIFI network (e.g., the user's personal WIFI network). The contextual data may also be historical data from the user's recent internet searches that were retrieved from the personal device or a predetermined list that includes preferences inputted by the user that may also be updated by the user. For example, the user may input a health plan to the predetermined list since the user does not want to view unhealthy food. The contextual data may also be images of the user (e.g., facial expressions of the user) collected by a camera associated with the dynamic parsing program 110a and 110b (FIG. 1) to determine a mood of the user.

At 208 the dynamic parsing program 110a and 110b (FIG. 1) identifies a relationship between the collected contextual data and the parsed content using known analytic software. The known analytic software may identify keywords from text within the parsed content that are substantially similar to keywords within text from the collected contextual data. For example, if the user inputs that the user is on a diet and does not want to view unhealthy food to the predetermined list, then the dynamic parsing program 110a and 110b (FIG. 1) may identify a relationship to any parsed content related to unhealthy food. As an additional example, if the user inputs their sleeping schedule to the predetermined list, then the dynamic parsing program 110a and 110b (FIG. 1) may identify a relationship to any parsed content related to intense videos or bright colors that may keep the user awake when the time of day is close to a time the user sleeps.

Additionally, the known analytic software may identify images of the user (e.g., facial expressions of the user), and then determine that the user is frustrated or under stress. The known analytic software may then identify a relationship between the identified images of the stressed out user and any parsed content that may upset the user (e.g., violent videos).

Then, at 210, the dynamic parsing program 110a and 110b (FIG. 1) determines whether the identified relationship satisfies a threshold. The threshold can be a strength of indication that the collected contextual data is related to the parsed content. The threshold may be a numerical representation of the relationship between the collected contextual data and the parsed content. If the dynamic parsing program 110a and 110b (FIG. 1) determines the identified relationship between the collected contextual data and the parsed content satisfies a threshold (step 210, "YES" branch), the parsing process 200 may continue to store the parsed content that is related to the collected contextual data in a database (e.g., database 114 (FIG. 1)) for future display (i.e., within a graphical user interface device (GUI)) at step 212. If the dynamic parsing program 110a and 110b (FIG. 1) determines the identified relationship between the collected contextual data and the parsed content does not satisfy a threshold (step 210, "NO" branch), the parsing process 200 may continue to display the parsed content of the webpage at step 216.

If the dynamic parsing program 110a and 110b (FIG. 1) determines the identified relationship between the collected contextual data and the parsed content satisfies a threshold at 210, then, at step 212, the dynamic parsing program 110a and 110b (FIG. 1) stores the parsed content that is related to the collected contextual data in a database (e.g., database 114 (FIG. 1)) for future display. The parsed content may be stored in the database 114 (FIG. 1) according to the date the content was parsed and/or a level of priority (e.g., high priority, medium priority, and/or low priority). For example, emails relating to work may have a higher priority than advertisements. The database 114 (FIG. 1) may be emptied in increment time intervals (e.g., every five days). Parsed content with a low priority level may be deleted in increment time intervals (e.g., ten days), if not displayed in the future within the increment time interval (e.g., the ten days). Future display may be a next time the user loads a webpage or the dynamic parsing program 110a and 110b (FIG. 1) may force the stored parsed content to be displayed (i.e., within the GUI) when the user is interacting with the personal device, if the stored parsed content is a high priority. The dynamic parsing program 110a and 110b (FIG. 1) may further record any contextual data or metadata associated with the webpage into a data repository (e.g., database 114 (FIG. 1)) so that predictive models may be generated based on any collected contextual data and metadata.

Next, at 214, the dynamic parsing program 110a and 110b (FIG. 1) displays a portion of the parsed content not stored in the database 114 (FIG. 1). The at least a portion of the parsed content may be displayed within a user interface (UI) of the personal device. The at least a portion of the parsed content may not have any identified relationship to the collected contextual data. Once the dynamic parsing program 110a and 110b (FIG. 1) displays a portion of the parsed content not stored in the database 114 (FIG. 1), the parsing process 200 may terminate.

However, if the dynamic parsing program 110a and 110b (FIG. 1) determines the identified relationship between the collected contextual data and the parsed content does not satisfy a threshold at 210, then, at step 216, the dynamic parsing program 110a and 110b (FIG. 1) displays the parsed content of the webpage. Once the dynamic parsing program 110a and 110b (FIG. 1) displays the parsed content of the webpage, the parsing process 200 may terminate.

Figure 3:
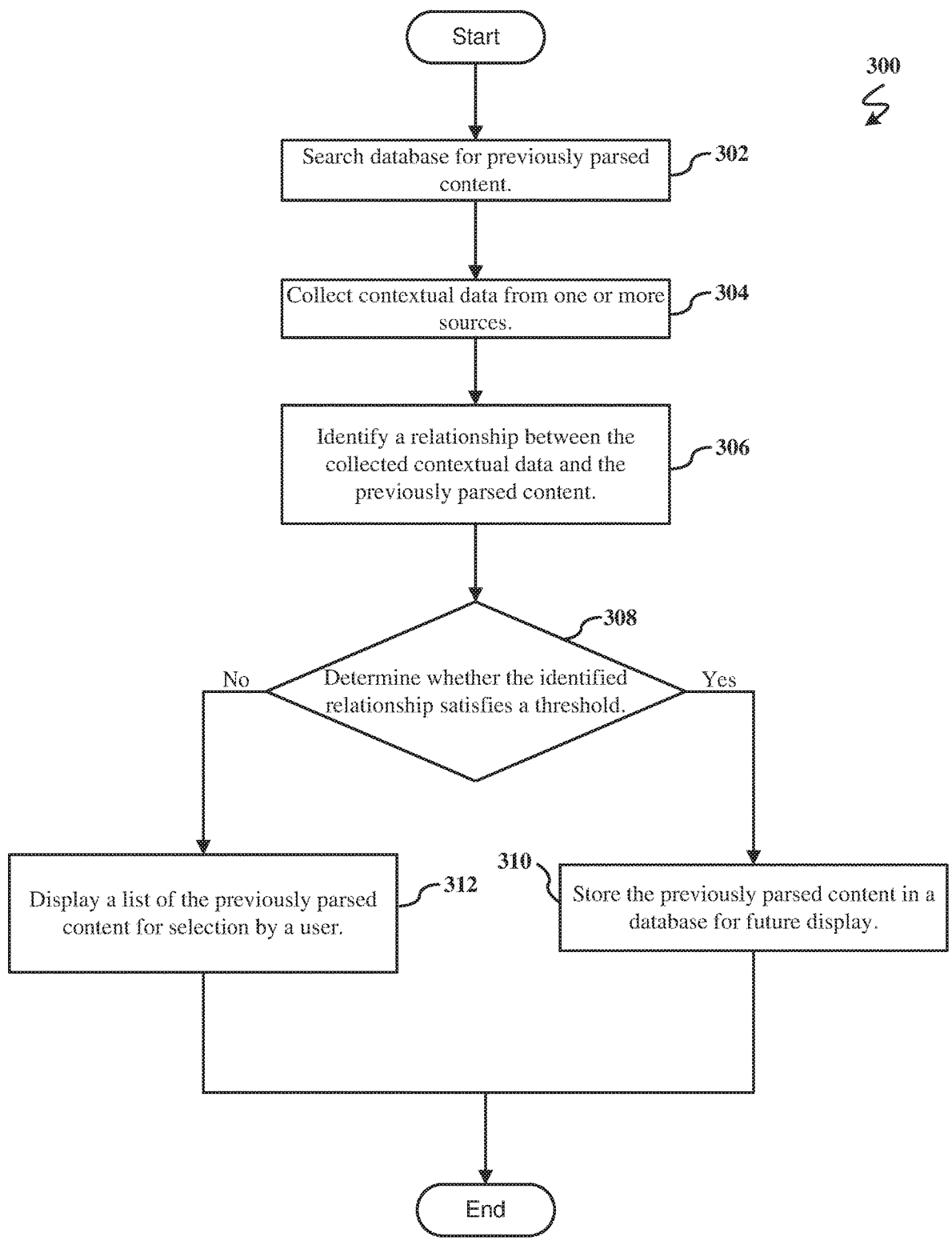
FIG. 3 illustrates an operational flowchart illustrating previously parsed content retrieving process by a dynamic parsing program according to at least one embodiment.

Referring now to FIG. 3, an operational flowchart illustrating an exemplary previously parsed content retrieving process 300 by the dynamic parsing program 110a and 110b (FIG. 1) according to at least one embodiment is depicted. At 302, the dynamic parsing program 110a and 110b (FIG. 1) searches a database (e.g., 114 (FIG. 1)) for previously parsed content, as previously described in FIG. 2. The database 114 (FIG. 1) may store the previously parsed content (e.g., advertisements, text, audio, and/or video) according to the date the content was parsed or according to a priority level of the previously parsed content (e.g., high priority to low priority). The previously parsed content may have been displayed within any webpage on the Internet (e.g., a news webpage, a cooking webpage, an event webpage, etc.).

Next, at 304, the dynamic parsing program 110a and 110b (FIG. 1) collects contextual data from one or more sources. The contextual data may be biometric data of the user (e.g., heartrate, body temperature, and/or mood) collected from a personal electric device (e.g., electronic watch, and/or laptop). The contextual data may be a geographic location of the user collected from the personal electronic device. The contextual data may also be data pertaining to electronic accessories (e.g., headphones) associated with the personal device. For example, the contextual data may be an indication that headphones are now plugged into the personal device or that the personal device has connected to a certain WIFI network (e.g., the user's personal WIFI network). The contextual data may also be historical data from the user's recent internet searches that were retrieved from the personal device or a predetermined list that includes preferences inputted by the user that may also be updated by the user. For example, the user may input a health plan to the predetermined list since the user does not want to view unhealthy food. The contextual data may also be images of the user (e.g., facial expressions of the user) collected by a camera associated with the dynamic parsing program 110a and 110b (FIG. 1).

At 306 the dynamic parsing program 110a and 110b (FIG. 1) identifies a relationship between the collected contextual data and the previously parsed content using known analytic software. The known analytic software may include image recognition techniques (e.g., facial recognition techniques) to image data collected by a camera. The known analytic software may identify keywords from text within the previously parsed content that are substantially similar to keywords within text from the collected contextual data. For example, if the user inputs that he is on a diet and does not want to view unhealthy food to the predetermined list, then the dynamic parsing program 110a and 110b (FIG. 1) may identify a relationship to any previously parsed content related to unhealthy food. As an additional example, if the user inputs their sleeping schedule to the predetermined list, then the dynamic parsing program 110a and 110b (FIG. 1) may identify a relationship to any previously parsed content related to intense videos or bright colors that may keep the user awake when the time of day is close to a sleep time of the user. Additionally, the known analytic software may identify images of the user (e.g., facial expressions of the user), and then determine that the user is frustrated or under stress. The known analytic software may then identify a relationship between the identified images of the stressed out user and any previously parsed content that may upset the user (e.g., violent videos).

Then, at 308, the dynamic parsing program 110a and 110b (FIG. 1) determines whether the identified relationship satisfies a threshold. The threshold can be a strength of indication that the collected contextual data is related to the previously parsed content. The threshold may be a numerical representation of the relationship between the collected contextual data and the previously parsed content. If the dynamic parsing program 110a and 110b (FIG. 1) determines the identified relationship between the collected contextual data and the previously parsed content satisfies a threshold (step 308, "YES" branch), the parsing process 300 may continue to store the previously parsed content that is related to the collected contextual data in a database (e.g., database 114 (FIG. 1)) for future display at step 310. If the dynamic parsing program 110a and 110b (FIG. 1) determines the identified relationship between the collected contextual data and the previously parsed content does not satisfy a threshold (step 308, "NO" branch), the parsing process 300 may continue to display a list of the previously parsed content for selection by a user at step 312. The threshold may be a numerical representation of a minimum allowed similarities between the contextual data and the previously parsed content. For example, if the numerical representation of the threshold is three similarities, and the contextual data and the previously parsed content share three or four similarities, then the threshold would be satisfied.

If the dynamic parsing program 110a and 110b (FIG. 1) determines the identified relationship between the collected contextual data and the previously parsed content satisfies a threshold at 308, then, at step 310, the dynamic parsing program 110a and 110b (FIG. 1) stores the previously parsed content that is related to the collected contextual data in a database (e.g., database 114 (FIG. 1)) for future display (i.e., within the GUI). The parsed content may be stored in the database 114 (FIG. 1) according to the date the content was parsed and/or a level of priority (high priority, medium priority, and/or low priority). For example, emails may have a higher priority than advertisements. The database 114 (FIG. 1) may be emptied in increment time intervals (e.g., every five days). Previously parsed content with a low priority level may be deleted in increment time intervals (e.g., ten days), if not displayed in the future within the increment time interval (e.g., the ten days). Future display may be a next time the user loads a webpage or the dynamic parsing program 110a and 110b (FIG. 1) may force the stored previously parsed content to be displayed when the user is interacting with the personal device, if the stored previously parsed content is a high priority. The dynamic parsing program 110a and 110b (FIG. 1) may further record any contextual data or metadata associated with the webpage into a data repository (e.g., database 114 (FIG. 1)) so that predictive models may be generated based on any collected contextual data and metadata. Once the dynamic parsing program 110a and 110b (FIG. 1) stores the previously parsed content in a database (e.g., database 114 (FIG. 1)) for future display, the parsing process 300 may terminate.

However, if the dynamic parsing program 110a and 110b (FIG. 1) determines the identified relationship between the collected contextual data and the previously parsed content does not satisfy a threshold at 308, then, at step 312, the dynamic parsing program 110a and 110b (FIG. 1) displays a list of the previously parsed content for selection by a user. The list of the previously parsed content may be organized according to the date the content was parsed or according to the priority level of the previously parsed content. The user may set up a user preference to delete previously parsed content stored within the database 114 (FIG. 1) in increment time intervals (e.g., ten days). The user may also organize the previously parsed content according to the user's preference. Once the dynamic parsing program 110a and 110b (FIG. 1) displays the list of the previously parsed content for selection by the user, the parsing process 300 may terminate.

According to an exemplary scenario, a user may receive a webpage from a network server while at work. The dynamic parsing program 110a and 110b (FIG. 1) may determine the user is at work by identifying the user's company WIFI network (collecting contextual data). The dynamic parsing program 110a and 110b (FIG. 1) may parse content of the webpage as described previously at 204 (FIG. 2), then determine which content may not be suitable for a work environment as described previously at 210 (FIG. 2). The dynamic parsing program 110a and 110b (FIG. 1) may then store the parsed content in the database 114 (FIG. 1) for future display as described previously at 212 (FIG. 2). When the user interacts with the user's personal device at a later time, the dynamic parsing program 110a and 110b (FIG. 1) may determine the user is at home by identifying the user's WIFI network as described previously at 306 (FIG. 3). The dynamic parsing program 110a and 110b (FIG. 1) may then display the stored parsed content that was not displayed at the user's work as described previously at 312 (FIG. 3).

According to another exemplary scenario, a user may receive a webpage from a network server while on a train. The dynamic parsing program 110a and 110b (FIG. 1) may determine the user is on a train by collecting contextual data (images from a camera) as described previously at 206 (FIG. 2), and then also determine the user does not have headphones plugged into a personal device (e.g., cellular phone) as described previously at 206 (FIG. 2). The dynamic parsing program 110a and 110b (FIG. 1) may parse content of the webpage as described previously at 204 (FIG. 2), then determine which content may not be suitable for the train environment (e.g., loud and/or offensive content) as described previously at 210 (FIG. 2). The dynamic parsing program 110a and 110b (FIG. 1) may then store the parsed content in the database 114 (FIG. 1) for future display as described previously at 212 (FIG. 2). When the user interacts with the user's personal device at a later time, the dynamic parsing program 110a and 110b (FIG. 1) may determine the user is at home, or the user has headphones plugged into the cellular phone as described previously at 306 (FIG. 3). The dynamic parsing program 110a and 110b (FIG. 1) may then display the stored parsed content that was not displayed while the user was on the train or while the user did not have headphones plugged in as described previously at 312 (FIG. 3).

According to yet another exemplary scenario, one or more personal devices of varying computing power may be electronically and communicatively coupled, and the dynamic parsing program 110a and 110b (FIG. 1) may be utilized on each personal device. In this case, a user may receive a webpage from a network server while at work as described previously at 202 (FIG. 2). The dynamic parsing program 110a and 110b (FIG. 1) may determine the user does not have a personal device capable of downloading content larger than a specified file size as described previously at 206 (FIG. 2). The dynamic parsing program 110a and 110b (FIG. 1) may parse content of the webpage as described previously at 204 (FIG. 2), then determine which content may not be suitable for the personal device to download as described previously at 210 (FIG. 2). The dynamic parsing program 110a and 110b (FIG. 1) may then store the parsed content in the database 114 (FIG. 1) for future display as described previously at 212 (FIG. 2). When the user interacts with another personal device of the user that is capable of downloading the stored content, the dynamic parsing program 110a and 110b (FIG. 1) may then display the stored parsed content as described previously at 312 (FIG. 3).

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
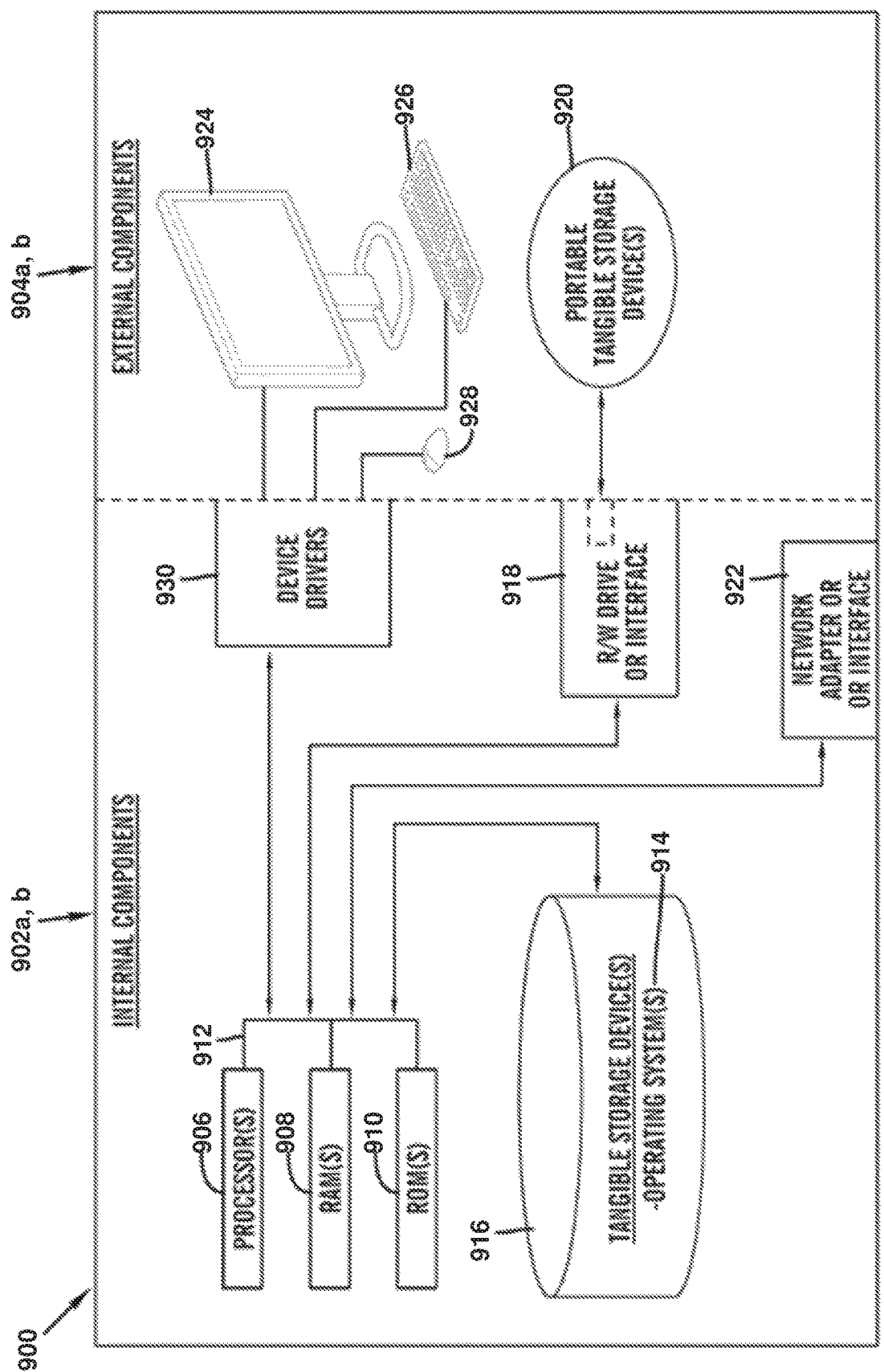
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 4. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the software program 108 (FIG. 1) and the dynamic parsing program 110a (FIG. 1) in client computer 102 (FIG. 1) and the dynamic parsing program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory, or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the dynamic parsing program 110a and 110b (FIG. 1) can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless WIFI interface cards, or 3G or 4G wireless interface cards or other wired or wireless communication links. The software program 108 (FIG. 1) and the dynamic parsing program 110a (FIG. 1) in client computer 102 (FIG. 1) and the dynamic parsing program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the dynamic parsing program 110a (FIG. 1) in client computer 102 (FIG. 1) and the dynamic parsing program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
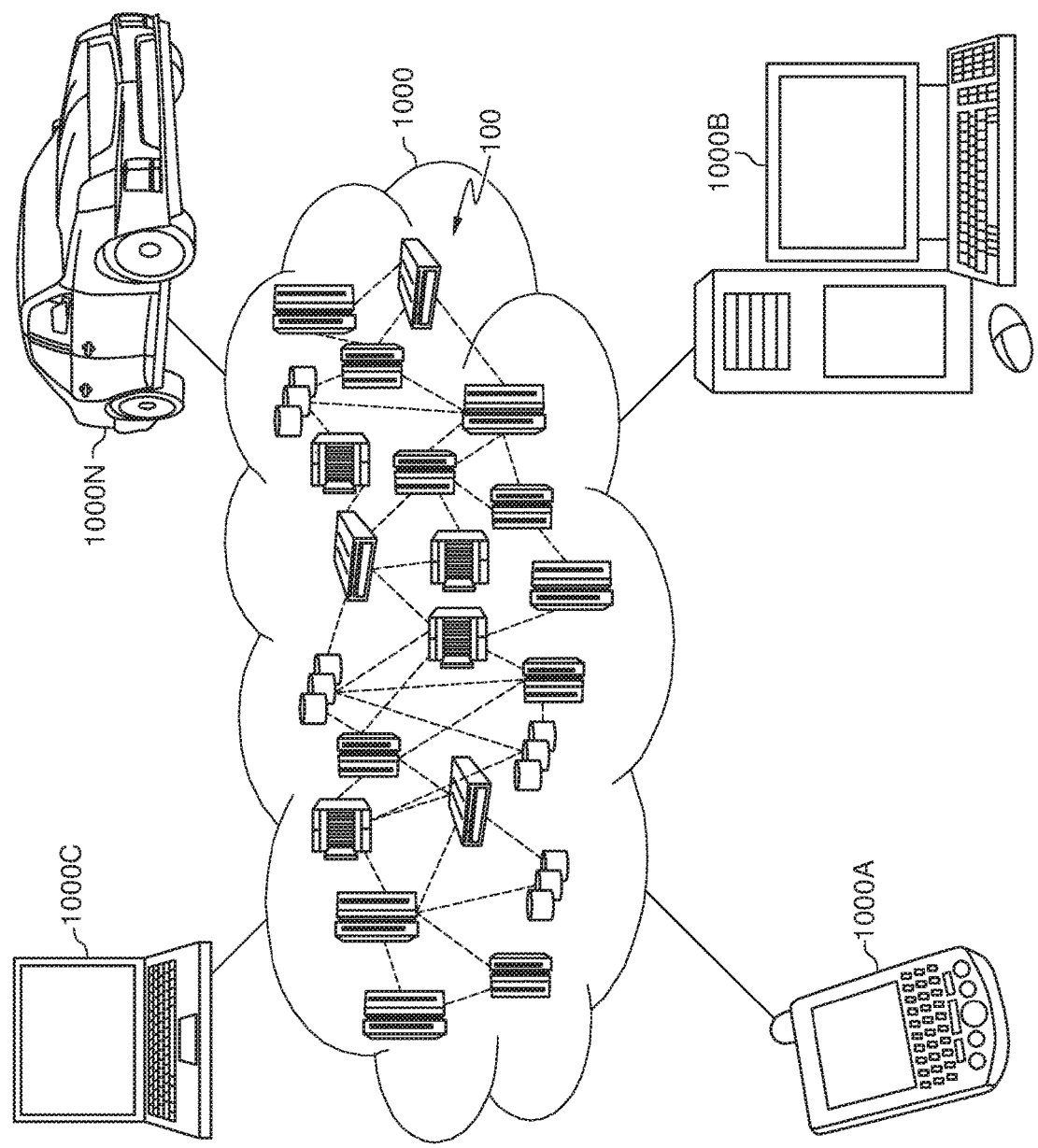
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
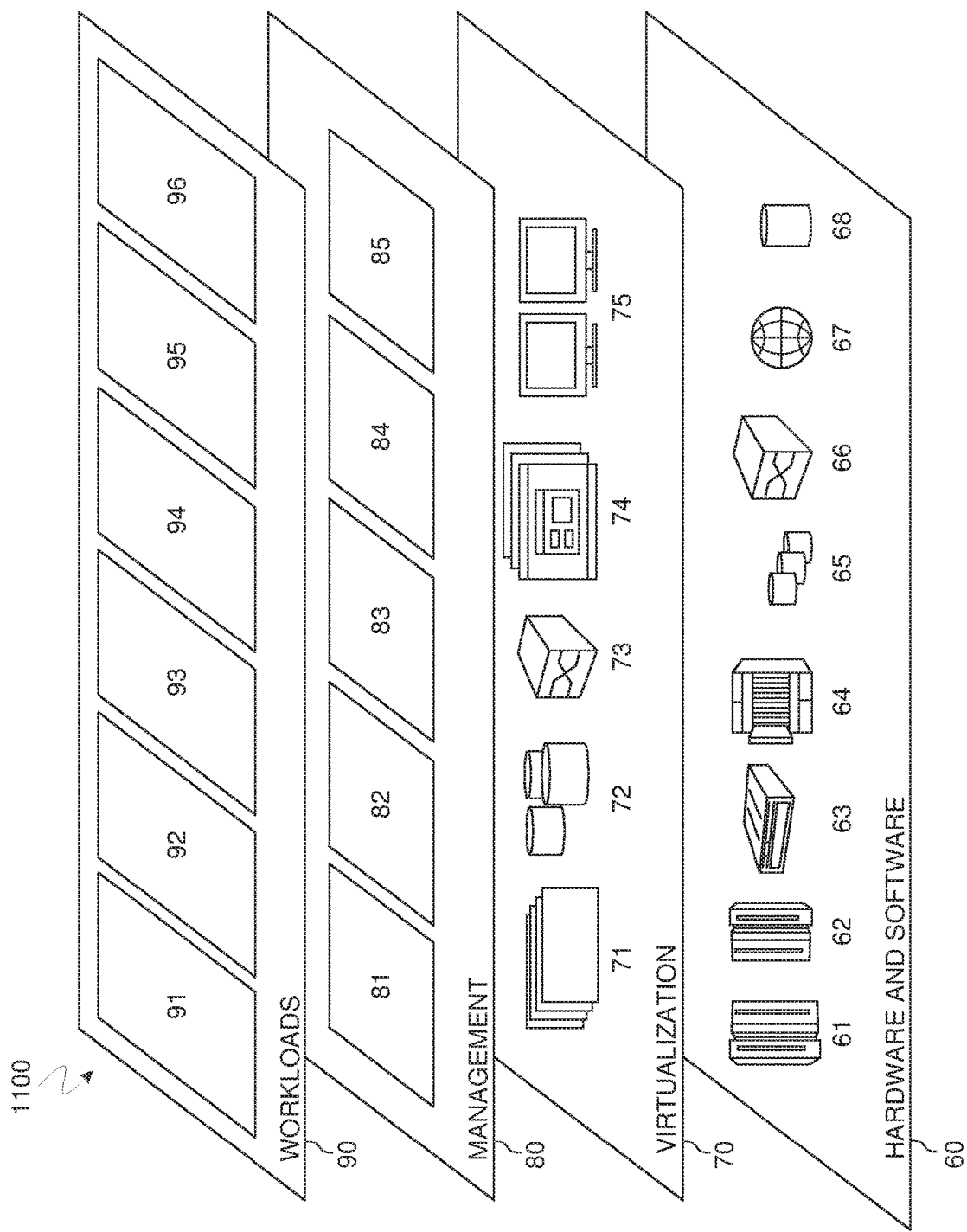
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and dynamic parsing 96. Dynamic parsing 96 provides a way to dynamically parse the webpage for content, as well as collect contextual data from one or more sources, then identify a relationship between the parsed content and the collected contextual data. Dynamic parsing 96 stores any parsed content that includes a relationship that satisfies a threshold in a database 114 (FIG. 1) for future display. Dynamic parsing 96 may display a list of stored parsed content for the selection by the user. The displayed list may be organized according to a priority of each of the parsed content or according to the date the content was parsed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for dynamically storing and displaying portions of parsed content of a webpage, the processor implemented method comprising:
   receiving the webpage from a network server;
   parsing content of the received webpage;
   collecting a first set of contextual data from one or more sources;
   identifying whether a first relationship exists between the collected first set of contextual data and the parsed content by satisfying a first threshold;
   responsive to the identifying being true:
      determining the first portion of the parsed content as a portion of the parsed content for which the first relationship exists, and a second portion of the parsed content that does not include the first portion;
      at a current time of the identifying:
         storing, and not displaying, only the first portion, in a database; and
         displaying, and not storing in the database, only the second portion; and
      at a future time after the identifying:
         displaying the web page with the first portion of the parsed content and not the second portion;
   responsive to the identifying being false:
      displaying, at the current time, the webpage with the parsed content.

2. The method of claim 1, further comprising:
   searching, by the processor, the database for previously parsed content;
   collecting, by the processor, a second set of contextual data from the one or more sources;
   identifying, by the processor utilizing analytic software, a second relationship between the second set of contextual data and the previously parsed content;
   determining, by the processor, the second relationship satisfies a second threshold; and
   displaying, by the processor, a list of the previously parsed content for selection by a user in response to the second relationship satisfying the second threshold.

3. The method of claim 2, wherein the displayed list of the previously parsed content for selection by the user is displayed within a graphical user interface device coupled to the processor.

4. The method of claim 2, wherein the displayed list of the previously parsed content is categorized according to a priority of the previously parsed content.

5. The method of claim 1, wherein the one or more sources are selected from the group consisting of a camera, body temperature sensor, and accelerometer.

6. The method of claim 1, further comprising:
   prioritizing, according to a set of criteria, the stored first portion of parsed content;
   prompting, based on satisfying a second threshold, one of the stored portion of parsed content with a highest priority to be displayed; and
   displaying the one of the stored portion of parsed content with the highest priority.

7. The method of claim 1, wherein the content of the parsed webpage includes text, audio, and video, and wherein the processor is a natural language processor capable of entity resolution techniques, wherein parsing further comprises:
   identifying, by the natural language processor, concepts and keywords within the received webpage;
   detecting, by the natural language processor, correlations and linguistic links between the identified concepts and keywords;
   establishing, based on the natural language processor utilizing the correlations and linguistic links, relevance of the correlations and linguistic links to determine a context of the received webpage; and
   generating, by the natural language processor, corresponding data structures for both the first and second portion of parsed content based on the determined context of the received webpage, wherein the corresponding data structures are in the form of a parse tree.

8. The method of claim 1, wherein the first set of contextual data is based on an item selected from the group consisting of heartrate, and facial expression.

9. The method of claim 1, wherein the first set of contextual data is based on an item selected from the group consisting of a work environment and a vehicle environment.

10. The method of claim 1, wherein the first set of contextual data is based on historical data from Internet searches of a user.

11. The method of claim 1, wherein the first set of contextual data is based on a detected mood of a user.

12. The method of claim 1, wherein the first set of contextual data is based on a user sleep time.

13. A computer system that dynamically stores and displays portions of parsed content of a webpage, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the one or more processors of the computer system are configured to:
      receive the webpage from a network server;
      parse content of the received webpage;

collect a first set of contextual data from one or more sources;
identify whether a first relationship exists between the collected first set of contextual data and the parsed content by satisfying a first threshold;
responsive to the identifying being true:
determine the first portion of the parsed content as a portion of the parsed content for which the first relationship exists, and a second portion of the parsed content that does not include the first portion;
at a current time of the identifying:
store, and not display, only the first portion in a database; and
display, and not store in the database, the webpage only the second portion; and
at a future time after the identifying:
display the web page with the first portion of the parsed content and not the second portion;
responsive to the identifying being false:
display, at the current time, the webpage with the parsed content.

14. The computer system of claim 13, wherein the one or more processors are further configured to:
search the database for previously parsed content;
collect a second set of contextual data from the one or more sources;
identify with analytic software, a second relationship between the second set of contextual data and the previously parsed content;
determine the second relationship satisfies a second threshold; and
display a list of the previously parsed content for selection by a user in response to the second relationship satisfying the second threshold.

15. The computer system of claim 14, wherein the displayed list of the previously parsed content is categorized according to a priority of the previously parsed content.

16. The computer system of claim 13, wherein the parsed content is stored in the database according to a range of priority.

17. The computer system of claim 13, wherein the one or more sources are selected from the group consisting of a camera, body temperature sensor, and accelerometer.

18. A computer program product that dynamically stores and displays portions of parsed content of a webpage, the computer program product comprising:
one or more computer-readable storage medium and program instructions stored on at least one of the one or more tangible storage medium, the program instructions executable by a processor that cause the processor to:
receive the webpage from a network server;
parse content of the received webpage;
collect a first set of contextual data from one or more sources;
identify whether a first relationship exists between the collected first set of contextual data and the parsed content by satisfying a first threshold;
responsive to the identifying being true:
determining the first portion of the parsed content as a portion of the parsed content for which the first relationship exists, and a second portion of the parsed content that does not include the first portion;
at a current time of the identifying:
store, and not display, only the first portion in a database; and
display, and not store in the database, the webpage only the second portion; and
at a future time after the identifying:
display the web page with the first portion of the parsed content and not the second portion;
responsive to the identifying being false:
display, at the current time, the webpage with the parsed content.

19. The computer program product of claim 18, wherein the program instructions executable by the processor further cause the processor to:
search the database for previously parsed content;
collect a second set of contextual data from the one or more sources;
identify, utilizing analytic software, a second relationship between the second set of contextual data and the previously parsed content;
determine the second relationship satisfies a second threshold; and
display a list of the previously parsed content for selection by a user in response to the second relationship satisfying the second threshold.

20. The computer program product of claim 18, wherein the one or more sources are selected from the group consisting of a camera, body temperature sensor, and accelerometer, and wherein the displayed list of the previously parsed content for selection by the user is displayed within a graphical user interface device coupled to the processor.

* * * * *